(12) United States Patent
Song et al.

(10) Patent No.: US 12,536,241 B2
(45) Date of Patent: Jan. 27, 2026

(54) COMBINED WIDE AND DEEP MACHINE LEARNING MODELS FOR AUTOMATED DATABASE ELEMENT PROCESSING SYSTEMS, METHODS AND APPARATUSES

(71) Applicant: NantMedia Holdings, LLC, El Segundo, CA (US)

(72) Inventors: Bing Song, La Canada, CA (US); Jeffrey Michael Balbien, Los Angeles, CA (US); Hao Lu, Los Angeles, CA (US); Phillip Yang, Los Angeles, CA (US); Patrick Soon-Shiong, Los Angeles, CA (US)

(73) Assignee: NantMedia Holdings, LLC, El Segundo, CA (US)

( * ) Notice: Subject to any disclaimer, the term of this patent is extended or adjusted under 35 U.S.C. 154(b) by 0 days.

(21) Appl. No.: 19/195,181

(22) Filed: Apr. 30, 2025

(65) Prior Publication Data
US 2025/0272346 A1    Aug. 28, 2025

Related U.S. Application Data

(63) Continuation of application No. 18/988,223, filed on Dec. 19, 2024, now Pat. No. 12,339,918, which is a
(Continued)

(51) Int. Cl.
*G06F 16/9535* (2019.01)
*G06F 40/284* (2020.01)
(Continued)

(52) U.S. Cl.
CPC ........ *G06F 16/9535* (2019.01); *G06F 40/284* (2020.01); *G06F 40/40* (2020.01); *G06N 3/045* (2023.01)

(58) Field of Classification Search
CPC ..................................................... G06N 3/045
See application file for complete search history.

(56) References Cited

U.S. PATENT DOCUMENTS 10,938,979 B1    3/2021   Dave et al.
11,210,583 B2   12/2021   Mathew et al.
(Continued)

OTHER PUBLICATIONS

Wu, F., et al., "MIND: A Large-scale Dataset for News Recommendation," p. 1-10 (2020).
(Continued)

*Primary Examiner* — Kris E Mackes
(74) *Attorney, Agent, or Firm* — Harness Dickey & Pierce P.L.C.

(57) ABSTRACT

A method of automated database element processing includes training a wide machine learning model with historical feature vector inputs to generate a wide ranked element output. The method includes training a deep machine learning model with the historical feature vector inputs to generate a deep ranked element output. The method includes generating a set of inputs specific to an individual entity, obtaining a set of current article database elements, and creating a feature vector input according to the set of inputs and the set of current article database elements. The method includes processing the feature vector input with the wide machine learning model to generate a wide ranked element list, processing the feature vector input with the deep machine learning model to generate a deep ranked element list, and merging database elements of the wide and deep ranked element lists to generate a ranked element recommendation output.

21 Claims, 9 Drawing Sheets

Related U.S. Application Data continuation of application No. 18/807,634, filed on Aug. 16, 2024, now Pat. No. 12,242,555, which is a continuation of application No. 17/643,881, filed on Dec. 13, 2021, now Pat. No. 12,105,765.

(60) Provisional application No. 63/125,570, filed on Dec. 15, 2020.

(51) Int. Cl.
  *G06F 40/40* (2020.01)
  *G06N 3/045* (2023.01)

(56) References Cited

U.S. PATENT DOCUMENTS

| | | | |
|---|---|---|---|
| 11,393,036 B2 | 7/2022 | Wang et al. | |
| 11,716,400 B2 | 8/2023 | Harish et al. | |
| 2014/0317105 A1* | 10/2014 | Jain | G06F 16/9535 707/731 |
| 2015/0088888 A1* | 3/2015 | Brennan | G06F 40/258 707/737 |
| 2015/0293897 A1* | 10/2015 | Myslinski | G06F 3/0488 707/755 |
| 2017/0300814 A1* | 10/2017 | Shaked | G06N 3/047 |
| 2018/0158004 A1* | 6/2018 | Davar | G06Q 10/0637 |
| 2018/0276305 A1* | 9/2018 | Liu | G06F 16/9535 |
| 2019/0050750 A1 | 2/2019 | Le et al. | |
| 2019/0139092 A1 | 5/2019 | Nomula | |
| 2020/0026769 A1* | 1/2020 | Tripodi | G06F 16/437 |
| 2021/0042374 A1* | 2/2021 | Davis | G06F 16/24578 |
| 2021/0097367 A1 | 4/2021 | Zhang et al. | |
| 2022/0188366 A1 | 6/2022 | Song et al. | |
| 2022/0197248 A1 | 6/2022 | Weinberg | |
| 2022/0222289 A1* | 7/2022 | Srinivasan | G06F 16/24578 |
| 2022/0230226 A1 | 7/2022 | Shahrasbi et al. | |
| 2022/0398643 A1 | 12/2022 | Sivakumar et al. | |
| 2023/0093756 A1* | 3/2023 | Banerjee | G06Q 30/0633 705/26.7 |
| 2023/0315781 A1* | 10/2023 | Huang | G06F 16/535 707/734 |
| 2024/0411827 A1 | 12/2024 | Song et al. | |
| 2025/0131055 A1 | 4/2025 | Song et al. | |

OTHER PUBLICATIONS

Cheng, H., et al., "Wide & Deep Learning for Recommender Systems," Jun. 24, 2016, p. 1-4.

Le, Q., & Mikolov, T., "Distributed Representations of Sentences and Documents," Google Inc., May 22, 2014, p. 1-9.

Wikipedia, "tf-idf" Aug. 25, 2020, https://en.wikipedia.org/wiki/Tf-idf.

Wikipedia, "Okapi BM25", Aug. 25, 2020, http://en.wikipedia.org/wiki/Okapi_BM25.

Reimers, N., & Gurevych, I., "Sentence-BERT: Sentence Embeddings using Siamese BERT-Networks," Aug. 27, 2019, p. 1-11.

Vaswani, A., et al., "Attention is All You Need," Dec. 6, 2017, p. 1-15.

Giorgi, J.M., et al., "DeCLUTR: Deep Contrastive Learing for Unsupervised Textual Representations," Jun. 11, 2020, pp. 1-22.

W. Jing and Y. Bailong (2021). News Text Classification and Recommendation Technology Based on Wide & Deep-Bert Model. IEEE International Conference on Information Communication and Software Engineering (ICICSE), 209-216.

Non-Final Office Action from U.S. Appl. No. 18/988,223 dated Feb. 12, 2025.

\* cited by examiner

COMBINED WIDE AND DEEP MACHINE LEARNING MODELS FOR AUTOMATED DATABASE ELEMENT PROCESSING SYSTEMS, METHODS AND APPARATUSES

CROSS-REFERENCE TO RELATED APPLICATIONS

This application is a continuation of U.S. patent application Ser. No. 18/988,223, filed Dec. 19, 2024, which is a continuation of U.S. patent application Ser. No. 18/807,634, filed Aug. 16, 2024, which is a continuation of U.S. patent application Ser. No. 17/643,881, filed Dec. 13, 2021, which claims the benefit and priority of U.S. Provisional Application No. 63/125,570, filed Dec. 15, 2020. The above application is incorporated herein by reference.

FIELD

The present disclosure relates to machine learning, and more specifically to combined wide and deep machine learning models for automated database element processing.

BACKGROUND

News organizations sometimes use personalized news recommendations to increase paid subscriptions, retain current subscribers and improve long-term user engagement. Many companies spend significant resources to research and develop workable news recommendation solutions. For example, Microsoft has implemented a large-scale dataset called Microsoft News Dataset (MIND), to stimulate further research, development, and competition in the area of personalized news recommendation.

Although, at a very high level news recommendation has many similarities with Netflix movie recommendations, or Amazon shopping recommendations, news recommendations are very dynamic by nature, which is reflected in both a user click history and a news article lifetime. The news article recommendation temporal windows may be several days, while the product recommendation windows for Amazon can be a year or more, meaning the news recommendation system may have to update its model much faster and more often to address the highly dynamic nature of news.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computerized method of automated database element processing includes training a wide machine learning model with historical feature vector inputs, using unsupervised learning, to generate a wide ranked element output. The historical feature vector inputs include historical article elements and access records associated with the historical article elements. The method includes training a deep machine learning model with the historical feature vector inputs, using unsupervised learning, to generate a deep ranked element output, and generating a set of inputs specific to an individual entity. The set of inputs are derived from element access records associated with the individual entity. The method includes obtaining a set of current article database elements, where the current article database elements are published according to specified time period criteria (such as a threshold or range), creating a feature vector input according to the set of inputs and the set of current article database elements, processing, by the wide machine learning model, the feature vector input to retrieve a wide model subset of the current article database elements having a high correlation with the element access records of the set of inputs, and processing, by the wide machine learning model, the wide model subset of the current article database elements to generate a wide ranked element list. The method further includes processing, by the deep machine learning model, the feature vector input to retrieve a deep model subset of the current article database elements having a high correlation with the element access records of the set of inputs, processing, by the deep machine learning model, the deep model subset of the current article database elements to generate a deep ranked element list, and merging database elements of the wide ranked element list and the deep ranked element list to generate a ranked element recommendation output.

In other features, the wide machine learning model includes a term frequency-inverse document frequency (TFIDF) model or a best matching (BM25) model. In other features, the deep machine learning model includes a Doc2Vec model or a deep contrastive learning (DECLUTR) model. In other features, creating the feature vector input for the wide machine learning model includes preprocessing text of each current article database element to concatenate an article title and description, and to remove stop words, and generating a clean token for each current article database element to use lowercase, and to remove punctuation and unrecognized words.

In other features, the method includes, in response to a determination that an elapsed time since training the wide machine learning model and the deep machine learning model satisfies training time period criteria, obtaining updated current article database elements from at least the last six months, obtaining an updated set of inputs specific to the individual entity from at least the last forty-five days, and retraining the wide machine learning model and the deep machine learning model according to the updated set of inputs and the updated current article database elements. In other features, the method includes determining whether a number of the element access records associated with the individual entity satisfies read articles count criteria, and in response to a determination that the number does not satisfy the read articles count criteria, obtaining a popular article database element list according to overall element access records of multiple entities, and appending the article database elements from the popular article database element list to the feature vector input.

In other features, the method includes, in response to a determination that an elapsed time since generating the ranked element recommendation output satisfies recommendation time period criteria, obtaining updated current article database elements, obtaining an updated set of inputs specific to the individual entity, and processing the updated current article database elements and the updated set of inputs with the wide machine learning model and the deep machine learning model to generate an updated ranked element recommendation output. In other features, the method includes at least one of determining a freshness score for a first one of the retrieved article database element according to a time period between a time when a recommendation API is called and a time that the retrieved article database element was published or otherwise made available, determining an entity-access score for the retrieved article database element according to a time period since the retrieved article database element was accessed by the individual entity, determining an access score for the retrieved article database element according to number of overall accesses of the retrieved article database element by multiple entities, determining a section score according to an overlap between a section of the retrieved article database element and a section of at least one of the element access records associated with the individual entity, and determining a byline score according to an overlap between a byline of the retrieved article database element and a byline of at least one of the element access records associated with the individual entity. In other features, the method includes calculating an overall rank score for the retrieved article database element according to a combination of the freshness score, the entity-access score, the access score, the section score and the byline score.

In other features, merging the database elements includes, for each database elements of the wide ranked element list and the deep ranked element list, removing the item from the ranked element recommendation output in response to a determination that an item retrieval score of the database element is greater than a retrieval maximum threshold or lower than a retrieval minimum threshold or other satisfaction criteria, and removing the item from the ranked element recommendation output in response to a determination that an overall rank score of the database element is greater than a rank maximum threshold or less than a rank minimum threshold or other satisfaction criteria. In other features, the method includes generating, by an autoencoder network, a dense wide feature output according to wide sparse features from the wide machine learning model and deep dense features from the deep machine learning model. In other features, the generating includes processing multiple input data elements via an encoder network, and processing multiple reconstructed data elements via a decoder network, to generate the dense wide feature output.

A computer system includes memory hardware configured to store historical feature vector inputs and computer-executable instructions. The historical feature vector inputs include historical article elements and access records associated with the historical article elements. The system also includes processor hardware configured to execute the instructions. The instructions include training a wide machine learning model with the historical feature vector inputs, using unsupervised learning, to generate a wide ranked element output, training a deep machine learning model with the historical feature vector inputs, using unsupervised learning, to generate a deep ranked element output, and generating a set of inputs specific to an individual entity. The set of inputs are derived from element access records associated with the individual entity. The instructions include obtaining a set of current article database elements, where the current article database elements are published within a specified time period threshold, creating a feature vector input according to the set of inputs and the set of current article database elements, processing, by the wide machine learning model, the feature vector input to retrieve a wide model subset of the current article database elements having a highest correlation with the element access records of the set of inputs, and processing, by the wide machine learning model, the wide model subset of the current article database elements to generate a wide ranked element list. The instructions also include processing, by the deep machine learning model, the feature vector input to retrieve a deep model subset of the current article database elements having a highest correlation with the element access records of the set of inputs, processing, by the deep machine learning model, the deep model subset of the current article database elements to generate a deep ranked element list, and merging database elements of the wide ranked element list and the deep ranked element list to generate a ranked element recommendation output.

In other features, the wide machine learning model includes a term frequency-inverse document frequency (TFIDF) model or a best matching (BM25) model. In other features, the deep machine learning model includes a Doc2Vec model or a deep contrastive learning (DECLUTR) model. In other features, creating the feature vector input for the wide machine learning model includes preprocessing text of each current article database element to concatenate an article title and description, and to remove stop words, and generating a clean token for each current article database element to use lowercase, and to remove punctuation and unrecognized words.

In other features, the instructions further include, in response to a determination that an elapsed time since training the wide machine learning model and the deep machine learning model is greater than or equal to a training time period threshold, obtaining updated current article database elements from at least the last six months, obtaining an updated set of inputs specific to the individual entity from at least the last forty-five days or other criteria, and retraining the wide machine learning model and the deep machine learning model according to the updated set of inputs and the updated current article database elements. In other features, the instructions further include determining whether a number of the element access records associated with the individual entity is greater than a read articles count threshold, and in response to a determination that the number is less than the read articles count threshold obtaining a popular article database element list according to overall element access records of multiple entities, and appending the article database elements from the popular article database element list to the feature vector input.

In other features, the instructions further include, in response to a determination that an elapsed time since generating the ranked element recommendation output is greater than a recommendation time period threshold, obtaining updated current article database elements, obtaining an updated set of inputs specific to the individual entity, and processing the updated current article database elements and the updated set of inputs with the wide machine learning model and the deep machine learning model to generate an updated ranked element recommendation output.

In other features, the instructions further include at least one of determining a freshness score for a first one of the retrieved article database element according to a time period between a time when a recommendation API is called and a time that the retrieved article database element was published, determining an entity-access score for the retrieved article database element according to a time period since the retrieved article database element was accessed by the individual entity, determining an access score for the retrieved article database element according to number of overall accesses of the retrieved article database element by multiple entities, determining a section score according to an overlap between a section of the retrieved article database element and a section of at least one of the element access records associated with the individual entity, and determining a byline score according to an overlap between a byline of the retrieved article database element and a byline of at least one of the element access records associated with the individual entity. In other features, the instructions further include calculating an overall rank score for the retrieved article database element according to a combination of the freshness score, the entity-access score, the access score, the section score and the byline score.

In other features, merging the database elements includes, for each database elements of the wide ranked element list and the deep ranked element list, removing the item from the ranked element recommendation output in response to a determination that an item retrieval score of the database element is greater than a retrieval maximum threshold or lower than a retrieval minimum threshold, and removing the item from the ranked element recommendation output in response to a determination that an overall rank score of the database element is greater than a rank maximum threshold or less than a rank minimum threshold.

In other features, the instructions further include generating, by an autoencoder network, a dense wide feature output according to wide sparse features from the wide machine learning model and deep dense features from the deep machine learning model. In other features, the generating includes processing multiple input data elements via an encoder network, and processing multiple reconstructed data elements via a decoder network, to generate the dense wide feature output.

A non-transitory computer-readable medium storing process-executable instructions, the instructions include training a wide machine learning model with historical feature vector inputs, using unsupervised learning, to generate a wide ranked element output. The historical feature vector inputs include historical article elements and access records associated with the historical article elements. The instructions include training a deep machine learning model with the historical feature vector inputs, using unsupervised learning, to generate a deep ranked element output, and generating a set of inputs specific to an individual entity. The set of inputs are derived from element access records associated with the individual entity. The instructions include obtaining a set of current article database elements, where the current article database elements are published within a specified time period threshold, creating a feature vector input according to the set of inputs and the set of current article database elements, processing, by the wide machine learning model, the feature vector input to retrieve a wide model subset of the current article database elements having a highest correlation with the element access records of the set of inputs, and processing, by the wide machine learning model, the wide model subset of the current article database elements to generate a wide ranked element list. The instructions also include processing, by the deep machine learning model, the feature vector input to retrieve a deep model subset of the current article database elements having a highest correlation with the element access records of the set of inputs, processing, by the deep machine learning model, the deep model subset of the current article database elements to generate a deep ranked element list, and merging database elements of the wide ranked element list and the deep ranked element list to generate a ranked element recommendation output.

In other features, the wide machine learning model includes a term frequency-inverse document frequency (TFIDF) model or a best matching (BM25) model. In other features, the deep machine learning model includes a Doc2Vec model or a deep contrastive learning (DECLUTR) model. In other features, creating the feature vector input for the wide machine learning model includes preprocessing text of each current article database element to concatenate an article title and description, and to remove stop words, and generating a clean token for each current article database element to use lowercase, and to remove punctuation and unrecognized words.

In other features, the instructions further include, in response to a determination that an elapsed time since training the wide machine learning model and the deep machine learning model is greater than or equal to a training time period threshold, obtaining updated current article database elements from at least the last six months, obtaining an updated set of inputs specific to the individual entity from at least the last forty-five days, and retraining the wide machine learning model and the deep machine learning model according to the updated set of inputs and the updated current article database elements.

In other features, the instructions further include determining whether a number of the element access records associated with the individual entity is greater than a read articles count threshold, and in response to a determination that the number is less than the read articles count threshold, obtaining a popular article database element list according to overall element access records of multiple entities, and appending the article database elements from the popular article database element list to the feature vector input.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
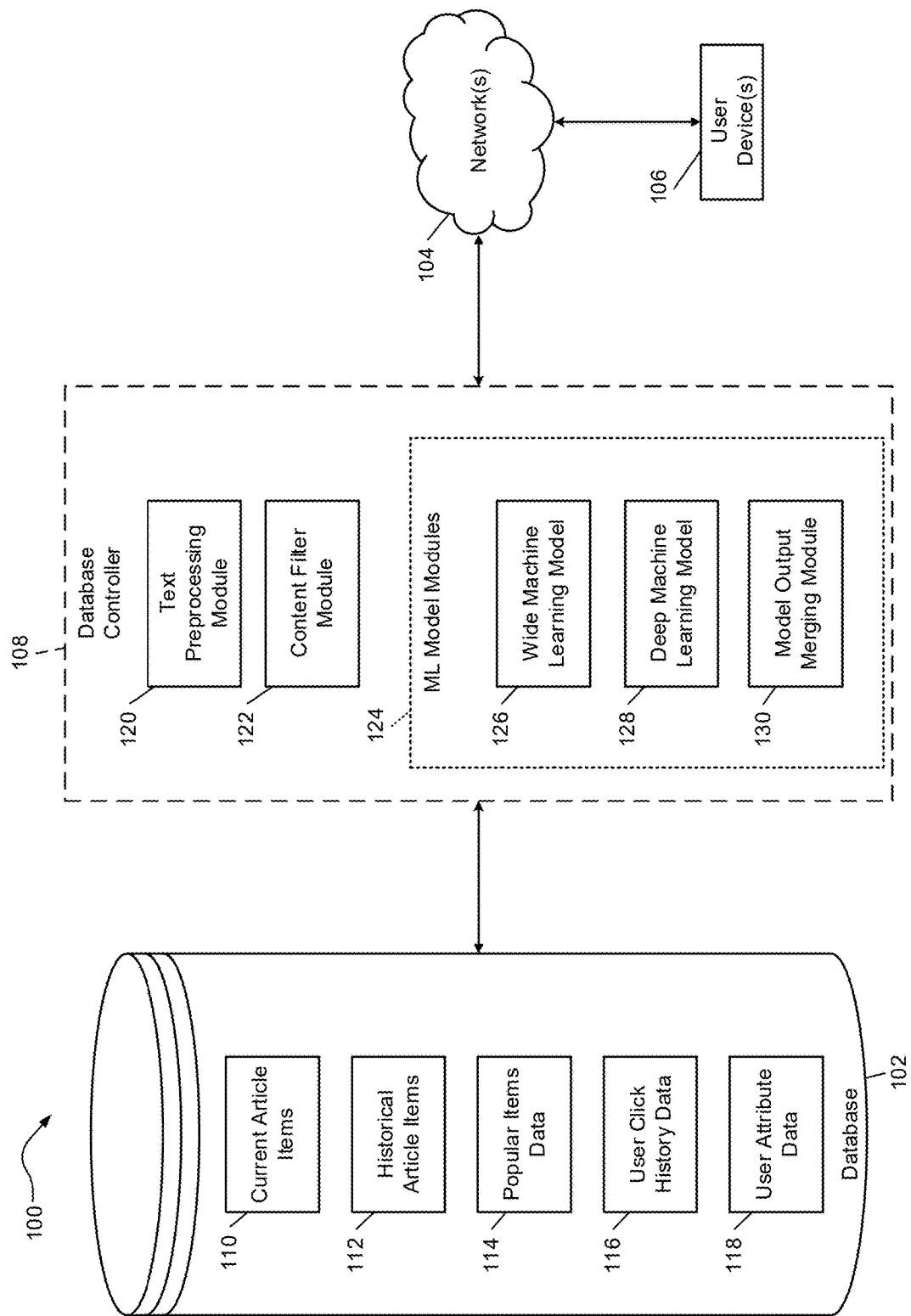
FIG. 1 is a functional block diagram of an example system including combined wide and deep machine learning models for automated database element processing.

With recent breakthroughs in the field of natural language processing (NLP), many news recommendation algorithms have been developed to take advantage of a transformer model. Although the click through rate (CTR) prediction of these models is improving, these models are usually computation intensive or cannot update new news items quickly, and therefore are not suitable for deployment as news recommendation tools for a news media company. For example, existing transformer models may be too expensive to scale to provide frequent updates of recommendations for many news article items that are constantly being issued, for many different users of a news media company (such as the LA Times or San Diego Tribune).

In various implementations described herein, feature based, end-to-end news recommendation systems are used to make personalized news article recommendations, and may not require labeled training data (although labeled training data may be used in various implementations to further improve the recommendations provided by the model). Any news organization may use the recommendation systems as long as the news article has a title (and optionally a summary such as a brief article description), and user click history is available. The system is scalable any may not be computation intensive. For example, various implementations may use serverless compute engines, such as Amazon Web Services (AWS) Fargate. A Fargate database builder may build or update a recommendation database every hour (or more or less frequently). Many Fargate web servers may be created by a load balancing system, so that the system can scale to handle many users of a news media company. This approach may reduce costs compared to existing models, such as by using the AWS Fargate system that may only cost about ten cents per hour (or more or less).

In some contexts, news articles may be referred to as items (for example, database elements), where items form the basic building blocks of a recommender system along with user data such as article click history (for example, a list of articles that a user has read previously). While the following discussion is presented within the context of news articles, various implementations may include areas other than news systems, that may benefit from technologies described herein. The system may use additional user attributes such as geolocation, the device currently being used to view articles, a sex of the user, an age of the user, a time, a day, etc. In various implementations, the number of clicks on each article, and the amount of time that a user stays with an article before closing it or navigating elsewhere, may be very important factors in the recommender system.

In various implementations, the recommender system combines a word matching machine learning model (sometimes referred to as a wide model), with a semantic machine learning model (sometimes referred to as a deep model), in order to improve the accuracy and variety of the news article recommendations. The system may not require labeled training data, and may train the wide and deep machine learning models using unsupervised learning.

Multiple sliding windows may be used on the user data and the item data, in order to improve the freshness of the recommended items, capture changing interests of the user, and improve response times for article recommendation queries. The system may be feature-based for both retrieval and ranking, and can scale up to billions of news article items and millions of users.

The recommender system may implement strong contextual correlation, where text information of the news articles plays a prominent role in the recommendation. In some cases, a news article may be recommended within an hour after it is published, although various implementations may use faster or slower recommendation times. Query response times to generate a list of recommended articles may be less than 100 milliseconds in some cases, although various implementations may use faster or slower query response times, depending on a desired approach or depth of analysis.

In various implementations, the recommendation algorithm may be classified into at least two categories, a collaborative filter and a content filter. The collaborative filter recommends news articles that were read by users with similar click history and profiles. The system may not be able to recommend stories effectively when the articles have not yet been read by a sufficient distribution of users, especially for articles that are less popular. The collaborative filter based system may have to wait for a long period of time (such as multiple hours) in order to collect enough user clicks to recommend a news story to other users, and some less popular articles may never receive enough clicks to get a recommendation via the collaborative filter.

A content filter recommends news article based on the similarity between the content of a news article and content of other articles that a user has read in the past. As soon as the content of the new article is available, the new article may be ready for a recommendation via the content filter if a content feature vector can be extracted from the new article. In various implementations, recommender systems may use the content filter approach to provide faster recommendations of new articles.

A retrieval system may rely on text features of new articles in order to retrieve new articles for potential recommendation (for example, by searching the text of articles to look for content that is similar to content of articles that a user has read in the past). A ranking system may rank new articles (such as a set of new articles retrieved by the retrieval system), by relying on both the text of the new articles and other attributes such as publish times of the new articles, sections in which the new articles are assigned, bylines of the new articles, user interest metrics such as an amount of time that a user has spent reading a new article, etc.

In addition to personalized news recommendation, a content filter may be used for roadblock article recommendations (for example, promotional article links or advertisements that may be inserted within another article, possibly in-line, as an advertisement to the user of suggested additional articles to read). The roadblock article link may be inserted in the other news article to attract the reader's attention, and hopefully persuade the user to click on the roadblock article.

As mentioned above, example systems herein may not require labeled training data, because both the wide and deep feature models may be built using unsupervised learning or a pre-trained model. In other implementations, labeled data may be used to improve the recommendation accuracy when the labeled data is available. Therefore, example recommender systems may be built and trained quickly using data that most news organization media companies already have.

Wide and Deep Machine Learning Model System

FIG. 1 is a block diagram of an example implementation of a system 100 including combined wide and deep machine learning models for automated database element processing. The system 100 includes a database 102 and a database controller 108. While the database 102 and the database controller 108 are generally described as being deployed in a computer network system, the database 102 and/or the database controller 108 may otherwise be deployed (for example, as a standalone computer setup). The storage device database 102 and the database controller 108 may include a desktop computer, a laptop computer, a tablet, a smartphone, etc.

As shown in FIG. 1, the database 102 stores multiple database elements, including current article items 110, historical article items 112, popular items data 114, user click history data 116, and user attribute data 118. The current article items 110, historical article items 112, popular items data 114, user click history data 116, and user attribute data 118 may be located in different physical memories within the database 102, such as different random access memory (RAM), read-only memory (ROM), a non-volatile hard disk or flash memory, etc. In some implementations, one or more of the current article items 110, historical article items 112, popular items data 114, user click history data 116, and user attribute data 118 may be located in the same memory (for example, in different address ranges of the same memory). In various implementations, the database 102 may store more or less (or other) types of database elements.

The database controller 108, which may be implemented as a server, includes multiple modules, which may be implemented via any suitable arrangement of computer software and/or hardware. As shown in FIG. 1, the database controller 108 includes a text preprocessing module 120, a content filter module 122, and machine learning modules 124. The machine learning modules 124 include a wide machine learning model 126, a deep machine learning model 128, and a model output merging module 130. In various implementations, the database controller 108 may include more or less (or other) suitable modules.

As shown in FIG. 1, the system 100 also includes a user device 106 (such as a tablet, a computer, a smart phone, a web-browser, an appliance, a set-top box, or a smart TV). The user device 106 may access the database 102 directly, or may access the database 102 through one or more networks 104 and/or the database controller 108. The user device 106 may include any suitable device for receiving inputs and displaying recommended articles to a user, such as a desktop computer, a laptop computer, a tablet, a smartphone, etc. Example networks 104 may include a wireless network, a local area network (LAN), the Internet, a cellular network, etc.

Figure 2:
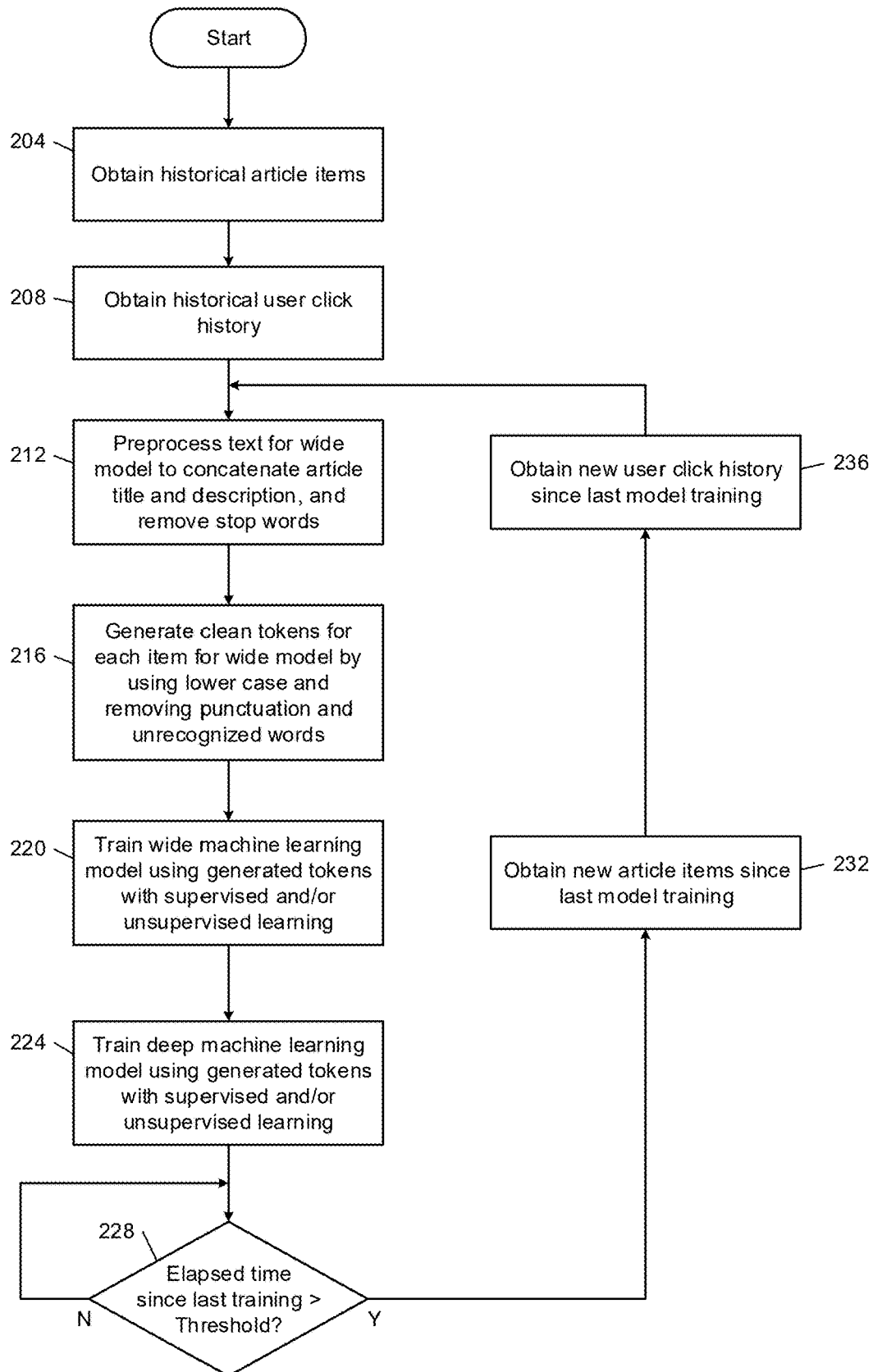
FIG. 2 is a flowchart depicting an example method of training wide and deep machine learning models of the system of FIG. 1.

FIG. 2 illustrates an example process for training wide and deep machine learning models, such as the wide machine learning model 126 and the deep machine learning model 128. At 204, control begins by obtaining historical article items. For example, articles that were previously published by a news organization during a specified prior time period (such as 180 days) may be obtained in order to train the wide and deep machine learning models.

At 208, control obtains historical user click history (such as an article element access record). For example, the historical user click history may indicate a number of user interactions (for example, clicks) on each of the historical article items that were obtained at 204 (or a user click history over a different time period such as 45 days). The user click history may be specific to an individual user, or may include multiple users that have read the article. The historical article items and historical user click history may be considered as historical database elements, and may be combined into a feature vector input for training the wide machine learning model and the deep machine learning model. While the present discussion involves user click history, various implementations may include a broad spectrum of user engagements, such as user views, view times, and eye movements as detected by camera sensors.

For example, historical input for each user from an LA Times database may include a news article ID, a location and type of device used to access an article, and list of click time stamps for accessing the news article. A historical feature vector may be generated according to NLP output, by converting text (such as one or more sentences or paragraphs), into the feature vector via a process called sentence embedding. The embedding process may use a term frequency-inverse document frequency (TFIDF) model for wide and deep contrastive learning, for the deep machine learning model.

The output of retrieval may include a list of scores in descending order. The scores may be normalized as appropriate. Due to cosine similarity, in some models the highest score may be 1.0. The output of the ranking may be a list of news article identifiers, where the first item on the list is a news article that the model recommends as the news article that the user will have the most interest in reading. In various implementations, news article inputs may include text (such as an article title and description), and a set of attributes (such as a publish time of the article, a section name of the article, bylines of the article, and an advertising unit for the article).

Control preprocesses the text for inputting to the wide machine learning model at 212. The preprocessing may include concatenating the article title and description, and removing stop words. In various implementations, other preprocessing suitable preprocessing techniques may be applied to standardize information and attributes of the article prior to training the wide machine learning model.

Control then proceeds to 216 to generate clean tokens for each historical article item, for training the wide machine learning model. For example, control may generate the clean tokens by using lowercase text and removing punctuation and unrecognized words from the clean tokens. Each token may be lemmatized. In various implementations, other suitable techniques may be applied to generate clean tokens in a standard format, for processing by the wide machine learning model. All relevant processed items may be used to build the wide and deep models, where sparse features are extracted using the wide model and dense features are extracted using the deep model. In various implementations, text may be tokenized to adjust for language independent analysis where tokens represent a core mean regardless of language.

At 220, control trains the wide machine learning model using the generated tokens. The training of the wide machine learning model may include supervised learning and/or unsupervised learning. For example, the wide machine learning model may be trained with historical article items to generate recommended articles for a user, and the output recommendations may be compared against actual historical article selections by users. In unsupervised learning, the wide machine learning model may analyze the historical article items to look for similarity patterns in order to recommend articles for a user to read.

Control trains a deep machine learning model using the generated tokens at 224, using supervised and/or unsupervised learning. Similar to training the wide machine learning model at 220, the deep machine learning model may be trained using supervised learning, where output recommendations are compared against actual historical article selections by users. In unsupervised learning, the deep machine learning model may analyze historical items to look for similarity patterns in order to recommend articles for a user to read.

After training the wide machine learning model and the deep machine learning model at 220 and 224, control proceeds to 228 to determine whether an elapsed time since the last training satisfies specified training time period criteria (such as whether the elapsed time is greater than a specified training time period threshold). In various implementations, satisfaction criteria described herein may include one or more suitable criteria values, such as a threshold, a range, a logical condition, an optional condition, a weight, etc. For example, the wide machine learning model and the deep machine learning model may be retrained periodically, such as every week, every month, or any other suitable time period. If control determines at 228 that the elapsed time since the last training of the wide and the deep machine learning models is not greater than the specified training period threshold, control continues to wait until the specified training period threshold is reached.

If control determines at 228 that the elapsed time since the last training of the wide machine learning model and the deep machine learning models is greater than the specified training period threshold, control proceeds to 232 to obtain new article items since the last model training. For example, if the wide and deep machine learning models are trained every week, control may obtain new article items that have been issued within the last week, at 232.

Control then proceeds to obtain new user click history since the last model training, at 236. For example, control may obtain a number of clicks by users on each of the new article items that were obtained at 232. Control then returns to 212 in order to preprocess the text of the new article items for retraining the wide machine learning model, and also to retrain the deep machine learning model with the new article items.

DataBase Attributes

Figure 3:
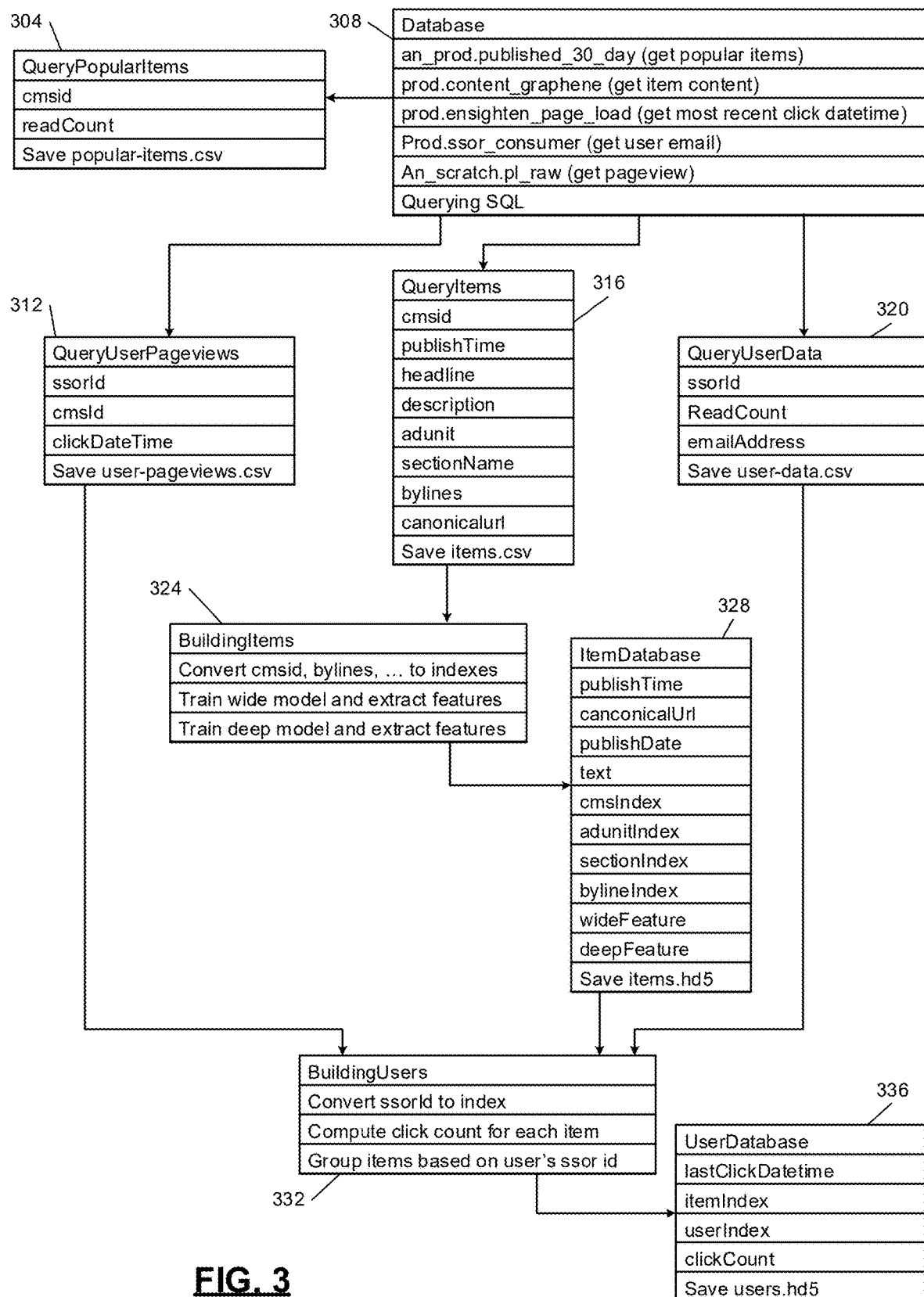
FIG. 3 is a functional block diagram illustrating example database elements of the system of FIG. 1.

FIG. 3 is a functional block diagram illustrating example database elements of the system 100 of FIG. 1. The functional block diagram of FIG. 3 also illustrates example function calls that may be performed on the database elements, such as the database controller 108 performing function calls on stored elements of the database 102. As shown in FIG. 3, the database element 308 includes a function call to get popular items (such as articles that received a number of clicks by other users above a popular item click count threshold), a function call to get item content such as text of articles, a function call to get the most recent click date and time (such as a timestamp of the most recent user click on an article), a function call to get a user email address, and a function call to get a page view count (such as a number of times that an article has been read). These function calls may query a structured query language (SQL) table such as a data structure.

The popular items element 304 illustrates an example of a query for popular article items, where a cmsID identifier of each article is stored with a readCount (for example, a number of times that users have read the article). Articles having a read count that is above a popular item count threshold indicative of a large number of user reads (such as at least 1% of all users reading an article, at least 10% of the users reading an article, etc.), may be saved in a popular item data structure.

The page views element 312 illustrates an example query for user page views. The page views element 312 stores an ssorID (for example, a single sign on registration identifier that identifies the user), and a cmsID that identifies the article. The user page view query also includes a clickDateTime attribute, such as a timestamp of when the user viewed the article. User page view data may be saved in a page view data structure.

As shown in FIG. 3, the query items element 316 illustrates item attributes. The query items element 316 includes a cmsID of the article, a publishing time of the article, a headline of the article, a description the article, advertisements associated with the article, the name of a section that the article may belong to, bylines of the article, and a canonical uniform resource locator (URL) address of the article. These attributes may be stored in an item data structure. In various implementations, the query items element 316 may include more or less (or other) attributes.

The user data element 320 stores attributes of a user, such as an ssorID identifier of the user, a read count of articles read by the user, and an email address of the user. The user data attributes may be stored in a user data structure. In various implementations, more or less (or other) user data attributes may be stored in the user data structure.

As shown in FIG. 3, the building items element 324 illustrates function calls that may be used for building items (for example, converting article attributes to indexes and extracting features for inputting to the wide and deep machine learning models). Example function calls may include converting a cmsID of each article, bylines of each article, etc., into indexes that are used as inputs to the wide machine learning model and the deep machine learning model. Features may be extracted from the wide machine learning model and the deep machine learning model, for storage in the item database element 328. For example, the item database element 328 may include article item attributes such as a publication time of the article, a canonical URL of the article, a publication date of the article, the text of the article, etc.

The item database element 328 may also store index features for the article item, which may include indexes generated by or extracted from the wide machine learning model and the deep machine learning model. For example, FIG. 3 illustrates a cmsID article identifier index, an advertising index, an article section index, an article byline index, one or more wide features extracted from the wide machine learning model, and one or more deep features extracted from the deep machine learning model. These elements may be stored in an item database data structure. In various implementations, the item database element 328 may include more or less (or other) attributes.

The building user element 332 illustrates example function calls for converting an ssorID of the user to an index, computing click counts for each article item, and grouping items based on a user's ssorID. The user database element 336 stores attributes about the user that have been indexed for input to the wide and deep machine learning models, such as the user's last click date and time, an item index of an article item viewed by the user, a user index including information related to the user, and a click count of the user. These user attributes may be stored in a user database data structure. In various implementations, the user database element 336 may include more or less open (or other) attributes.

As an example, an item database may contain two years of LA Times articles (which may include approximately 100,000 articles or more), while a user database includes the last 45 days of click history for LA Times subscribers (which may include approximately 300,000 subscribers or more). In various implementations, both the user database and the item database may be rebuilt and retrained every hour (or other suitable time period), to include the latest published articles. Incremental training or fine-tuning may be important where the system is updated every hour (or every five minutes or any other suitable period). In various implementations, the database may be built on a cloud platform, such as Amazon services, and may generate a .csv file of popular items or other database elements.

Figure 4:
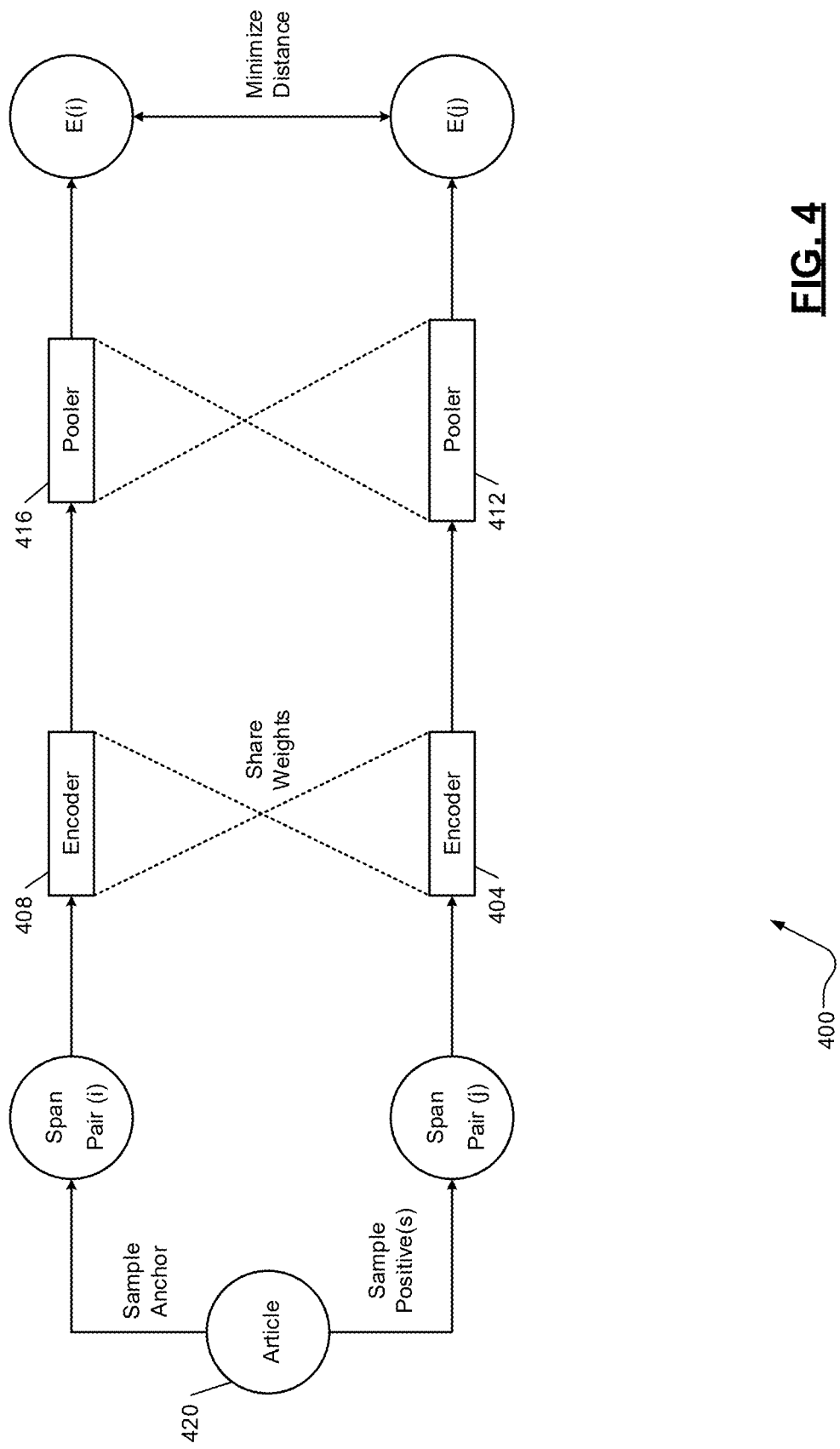
FIG. 4 is a functional block diagram of an example deep machine learning model of the system of FIG. 1.

FIG. 4 is a functional block diagram of an example deep machine learning model 400. The model 400 includes a combination of bidirectional encoder representations from transformers (BERT) models (the encoders 404 and 408) (See en.wikipedia.org/wiki/BERT (language model)), and Siamese network elements (the poolers 412 and 416), which may be used to extract sentence embedding. The BERT encoder weights are shared between the encoders 404 and 408, and contrastive loss is used to minimize the distance between the twin output elements E(i) and E(j).

In various implementations, the deep machine learning model 400 may be considered to operate with self-supervised contrastive loss. Textual representations via a contrastive loss may be generated by maximizing agreement between textual segments (for example, the span pair (i) and the span pair (j)), sampled from nearby one another in the same input article 420.

A data loading step may randomly sample paired anchor-positive spans from each input article 420 in a minibatch of size N. The sampling procedure may be designed to maximize the chance of sampling semantically similar anchor-positive pairs. Each encoder 404 and 408 maps each token in the input spans to a word embedding. Each encoder 404 and 408 may be a transformer-based language model, such as the BERT model.

Each pooler 412 and 416 maps encoded spans to fixed-length embeddings, and its corresponding mean positive embedding. Pairing each anchor embedding with the mean of multiple positive embeddings may provide improvements when compared to using a single positive example for every anchor. A contrastive loss function is defined for a contrastive prediction task. Given a set of embedded spans $\{ek\}$ including a positive pair of examples $ei$ and $ei+AN$, the contrastive prediction task aims may attempt to identify $ei+AN$ in $\{ek\}k \neq i$ for a given $ei$, where A is a number of anchor spans sampled per input article 420.

During training, a minibatch of N documents from the training may be sampled, where the contrastive prediction task is defined on anchor-positive pairs $ei$, $ei+AN$ derived from the N documents, resulting in 2AN data points. The other $2(AN-1)$ instances within a minibatch may be treated as negative examples In various implementations, regarding the self-supervised contrastive objective, for each input article 420 in a minibatch of size N, A anchor spans may be sampled per input article 420, with P positive spans per anchor. FIG. 4 illustrates a simplified case where A=P=1, and the anchor-positive span pairs are denoted as span pair (i) and span pair (j). Both spans are fed through the same encoders 404 and 408, and poolers 412 and 416, to produce the corresponding embeddings E(i) and E(j).

The encoders 404 and 408, and poolers 412 and 416, may be trained to minimize the distance between embeddings via a contrastive prediction task (where the other embeddings in a minibatch are treated as negatives). Positive spans may overlap with, be adjacent to, or be subsumed by, the sampled anchor span. The length of anchors and positives may be randomly sampled from beta distributions, skewed toward longer and shorter spans, respectively.

As mentioned above, at least a portion of the deep machine learning model may include a bidirectional encoder representations from transformers (BERT) model. For example, the BERT model may include multiple encoder layers or blocks, each having a number of elements. The model may also include feed-forward networks and attention heads connected with the encoder layers, and back propagation between the encoder layers. In various implementations, unlabeled article and user data may be supplied to the input of the deep and/or wide machine learning models to pre-train the models. The input may include one or more classification tokens, a mask of at least a portion of the input data, etc.

A positional encoder may apply time stamps to articles in the input sequence to maintain a timing relationship of the articles. In various implementations, a fully connected neural network (e.g., adapter) converts the positional encoded vector to a fixed-size vector. The size of vector is determined by model dimension. Masks may be applied at randomly selected intervals, with the modified input then fed into the BERT model, where the BERT model attempts to predict the output at the mask locations.

For example, the transformer may take the input and flow the input through a stack of encoder layers. Each layer may apply self-attention, and then pass its results through a feed-forward network before handing off to the next encoder layer. Each position in the model outputs a vector of a specified size. In various implementations, the focus may be on the output of a first position where a classification token was passed, where an output classification token may be used for a desired classifier. The output classification token may be fed through a feed-forward neural network (and optionally a softmax network), to provide a class label output.

Some existing recommendation systems use models that include both memorization and generalization. Memorization may be defined as learning the frequent co-occurrence of items or features, and exploiting the correlation available in the historical data. Generalization may explore new feature combinations that have never occurred, or rarely occurred, in the past. Both memorization and generalization may be achieved in one model, by jointly training a linear model component and a neural network component. Such a model may require labeled training data, which may not exist for many news organizations such as the LA Times. The text of the articles may not be used in the memorization and generalization model, because the model was not designed for news recommendations. The memorization and generalization may not be scalable, and may only be used for ranking in some cases. A retrieval algorithm may be required to reduce the number of items before the items are fed to the memorization and generalization model. In various implementations described herein, unsupervised end-to-end models are developed that include features of memorization and generalization.

Various implementations of models described herein may make recommendations based on attributes and text of an article (such as text of a title of the article, a summary of the article, or the content of article), and may include scalable models, which have end-to-end features that include both retrieval and ranking functionality. A wide-and-deep model concept may be extended to an entire recommendation system.

In various implementations, a scalable recommendation system uses two-stage processing. The first stage is referred to as retrieval. In this stage, several hundred items may be selected from millions or billions items. The second stage is referred to as ranking. The output of the ranking process may include a sequence of items in a descending order of recommendation.

Efficient retrieval may use a feature-based algorithm, such as a KD-tree nearest neighbor search. The KD-tree algorithm may search billion of items efficiently to generate the retrieval list. In order to use unsupervised training, the features may be extracted without labeled data, or using a pre-trained model through learning transfer.

In various implementations, scaling from several thousand up to one billion (or more) new articles may be implemented using search algorithms designed for fast searching capabilities. For example, a dataset may be segmented into pieces, with Voronoi cells defined in a d-dimensional space, and each database vector falling within one of the cells. During a search, only the database vectors y that are contained in the cell that the query x falls in, and a few neighboring ones, may be compared against the query vector.

An IndexIVFFlat index may be used, which may require a training stage that can be performed on any collection of vectors that has the same distribution as database vectors (for example, the database vectors themselves may be used). In various implementations, the IndexIVFFlat index may use another index, such as a quantizer, that assigns vectors to the Voronoi cells. Each cell may be defined by a centroid, and finding the Voronoi cell that a vector falls within may include finding a nearest neighbor of the vector in a set of centroids. The search method may include multiple parameters, such as the total number of cells, and the number of cells that are visited to perform a search. The search time may increase linearly with the number of probes, plus a constant due to the quantization.

In various implementations, if the number of features is less than one hundred thousand, a brutal search may be the preferred search algorithm. If there are more than one million features, a preferred search algorithm may include the hierarchical inverted file system (IVF). If there are one billion features or more, a preferred search algorithm may include product quantization for a nearest neighbor search with IVF. Separating the types of search algorithms used according to the number of features may improve retrieval scalability.

Some example wide machine learning models types for converting text to wide feature outputs include a term frequency-inverse document frequency (TFIDF) model, or a best matching (BM25) model. In the wide model, features are sparse, and matching may be based on the frequent occurrence of key words in the text of the article. A bag-of-words (BOW) algorithm may be used to ignore word orders in sentences. In various implementations, n-grams or other tokenized encodings may be used in addition to, or as an alternative to, searching for single word matches.

Some example deep machine learning models include a BERT plus Siamese model (for example, as illustrated in FIG. 4), a Doc2Vec model, or a deep contrastive learning (DECLUTR) model. These models may have dense features, and may user unsupervised training or pre-trained models through learning transfer. In various implementations, the item retrieval may be based on the text information in the headline and summary of the articles, and item ranking may be based on item attributes such as bylines, article sections, and article freshness. In various implementations, item ranking may be performed based on a combination of text information and item attributes.

As an example, a query item may have a section of "Business", a title of "Review: Grubhub offers drivers transparency and lots of gigs", and a description of "GrubHub is one of the better food delivery apps for drivers. It combines brisk demand with some pay guarantees and better-than-average delivery transparency." The query item may be an article that a user has read, where the wide and deep machine learning modes are used to retrieve and rank similar articles.

In this example, both the wide and deep models may return a match item having a section of "Business," a title of "Uber offers to buy Grubhub, plans to sell $900 million in bonds", and a description of "Uber's offer to acquire Grubhub could combine two of the largest food delivery apps in the U.S. as the coronavirus pandemic boosts demand for such services."

As an example of an item returned only by the wide model, a matched article by the wide model may have a section of "Business", a title of "Looking for work as a driver? Try delivery services", and a description of "Uber and Lyft used to be the undisputed leaders in providing jobs for independent contractors who wanted to drive for a living. The coronavirus changed that." As an example of an item returned only by the deep model, a matched article by the deep model may have a section of "Food", a title of "Seven must-try takeout upstarts claim their place in L.A.'s dining universe", and a description of "Talented chefs are supporting themselves by starting takeout services."

In various implementations, the deep machine learning model may be speculative. For example, a query item to the deep model may have a title of "Gunman who opened fire at Walmart facility was a former employee," and a description of "There also was a fire at the site, and the suspect appears to have rammed a vehicle into the building, dispatchers said. There were about 200 workers inside the facility." An item returned by the deep model may have a section of "California", a title of "5 donkeys struck and killed on 215 Freeway in Riverside County", and a description of "Callers began reporting a herd of wild burros entering the 215 Freeway around 2:23 a.m., the CHP says."

Automated Item Recommendation

Figure 5:
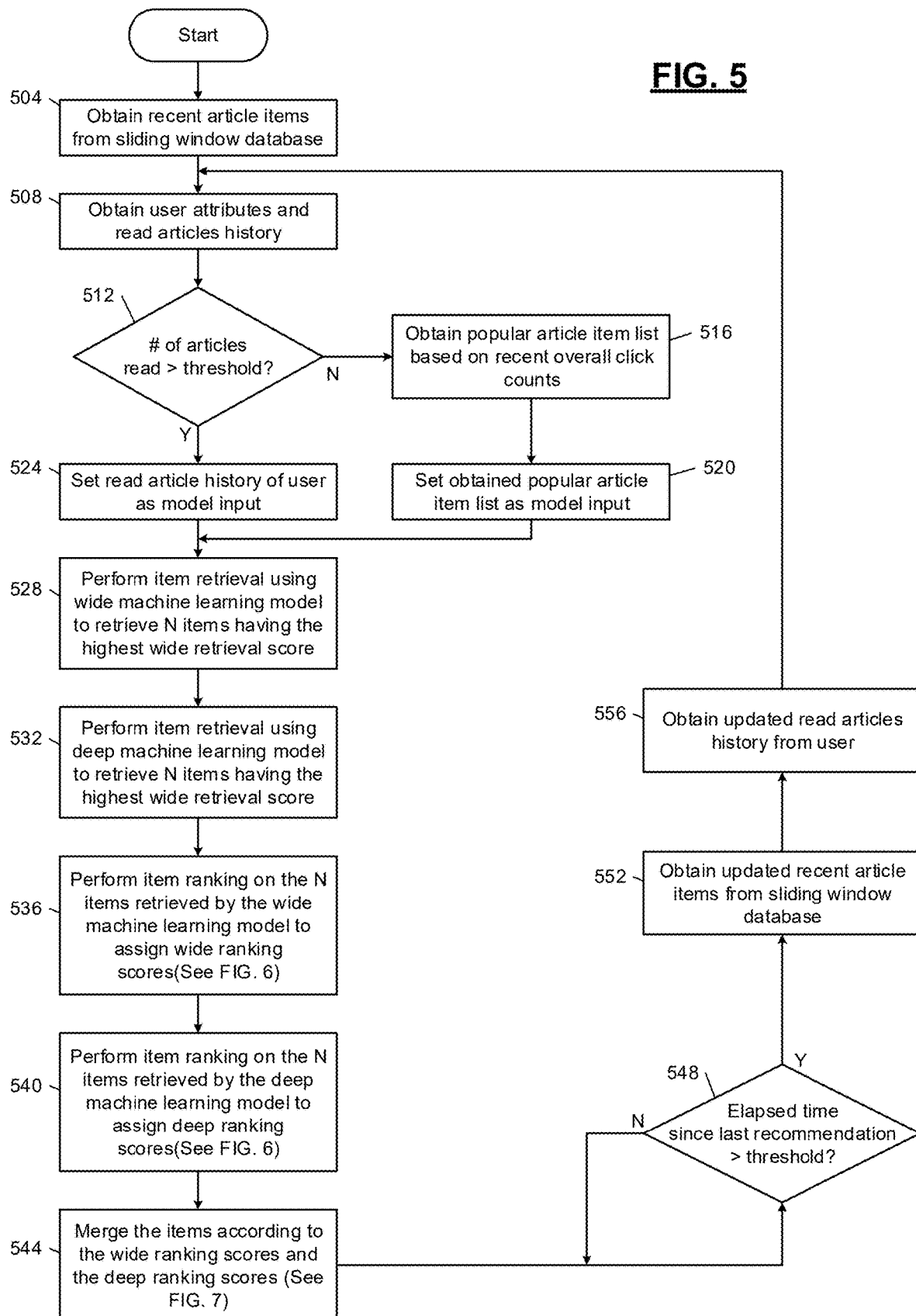
FIG. 5 is a flowchart depicting an example method of generating an item recommendation using wide and deep machine learning models.

FIG. 5 is a flowchart depicting an example method of generating an item recommendation using wide and deep machine learning models. Control begins at 504 by obtaining recent article items from a sliding window database. For example, control may obtain articles from a most recent weekly sliding window, a most recent monthly sliding window, a most recent 45 days sliding window, etc. In various implementations, the sliding window may be adjusted based on attributes other than time, such as a proximity of a location of the user to a location of the events in the news article or a location of the news organization that published the article, demographics of the user, etc.

At 508, control obtains user attributes and a read articles history for the user (sometimes referred to as an individual entity). Control then proceeds to 512 to determine whether the number of articles read is greater than a specified read count threshold. The specified read count threshold may be indicative that there are enough read article data points (for example, at least ten articles, at least fifty articles, etc.), to make an article recommendation based on the user's read history.

If control determines at 512 that the number of articles read is not greater than the specified threshold, control obtains a popular item list based on recent overall click counts at 516. For example, if the user has not yet read enough articles to base recommendations off of a read history of the user, control may start by selecting articles that are most popular to the overall readership of the news organization. At 520, control sets the obtained poplar article item list as the model input.

If control determines at 512 that the user's number of articles read is greater than the specified read count threshold, control proceeds to 524 to set the read article history of the user as the model input. For example, if the user has a sufficient number of articles read in their history, the model may use the read history of the user instead of (or in addition to) the popular article item list, in order to make article recommendations for the user.

At 528, control performs item retrieval using the wide machine learning model to retrieve N items having the highest wide retrieval score. For example, an item retrieval score may be defined as shown in Equation 1 below.

$$S_{retrieval,t} = \frac{f_{u,t}^T f_{i,t}}{|f_{u,t}||f_{i,t}|} \quad \text{Equation (1)}$$

where t∈[w, d], subscript w represents a wide model feature, subscript d represents a deep model feature, u represents an item that the user read, and i represents an item in the database. In various implementations, the item database may contain 1,000 items, 100,000 items, or even more items. For personal news recommendations, a time window of several days may be used, which may include approximately 1,000 news items. For roadblock recommendations, the time window may be one year or longer, which may include approximately 100,000 items. The system may select a number of items having the best match (for example, the top five items), for each article that a user has read. At 532, control performs item retrieval using the deep machine learning model to retrieve N items having the highest deep retrieval score.

At 536, control performs item ranking on the N items retrieved by the wide machine learning model, to assign the wide ranking scores. An example of the item ranking process is illustrated further in FIG. 6. Control then proceeds to 540 to perform item ranking on the N items retrieved by the deep machine learning model, to assign deep ranking scores. As mentioned above, an example of the item ranking process is illustrated further in FIG. 6. Control then merges the items according to the wide ranking scores and the deep ranking scores, at 544. An example process for merging the scores is illustrated in FIG. 7, and described further below.

The recommended items may be presented to the user in any suitable manner. For example, the recommended articles may be displayed on a user interface of a device the user is viewing content with, or the recommended articles may be stored in a database that can be accessed later by the user to select from among the recommended articles. In various implementations, an application programming interface (API) may be used to obtain the recommended articles.

At 548, control determines whether an elapsed time since the last recommendation is greater than a specified time period threshold. For example, the sliding window of article candidates for recommendation may be updated periodically, such as every hour, every day, every five days, every week, every 180 days, etc. If the elapsed time since the last recommendation has not exceeded the specified timer period threshold, control continues to wait until the time period is reached.

If control determines at 548 that the elapsed time since the last recommendation is greater than the specified timer period threshold, control proceeds to 552 to obtain updated recent article items from the sliding window database. For example, control may obtain more recent articles that were published after the end of the prior sliding window. Control may shift the sliding window by the specified timer period threshold, in order to capture the more recent articles.

In addition to obtaining the updated recent article items from the sliding window database, control obtains an updated read articles history of the user at 556. For example, control may obtain articles that have been read by the user after the end of the prior sliding window. Control may shift the sliding window by the specified timer period threshold, in order to capture the more recent user read articles.

In various implementations, although the item database may contain several years of article items, only items published within a recent time period (such as the last five days), may be used for the personalized news recommendation. The number of candidate items for recommendation may be limited to about one thousand, and the query items that the user has read may be limited to about one hundred, which may facilitate quick query responses.

In various implementations, the sliding windows for roadblock items may be longer, such as six months or more. In this case, the number of candidate items for the roadblock recommendation may also be larger, such as approximately 40,000 articles or more. When there is only one query item for the roadblock recommendation, the query response time may still be in the millisecond range. In various implementations, each roadblock uses a URL, which may be used to generate recommendations. Each roadblock may have a UUID, which can be used to retrieve content for the roadblock.

Figure 6:
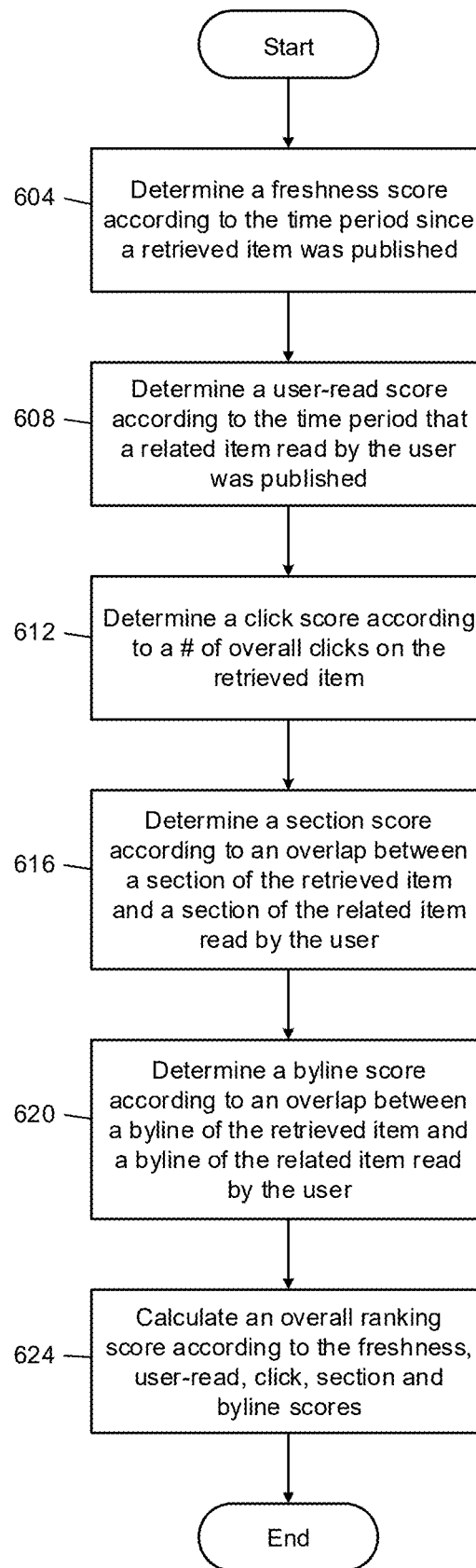
FIG. 6 is a flowchart depicting an example method of ranking items retrieved by wide and deep machine learning models.
Figure 7:
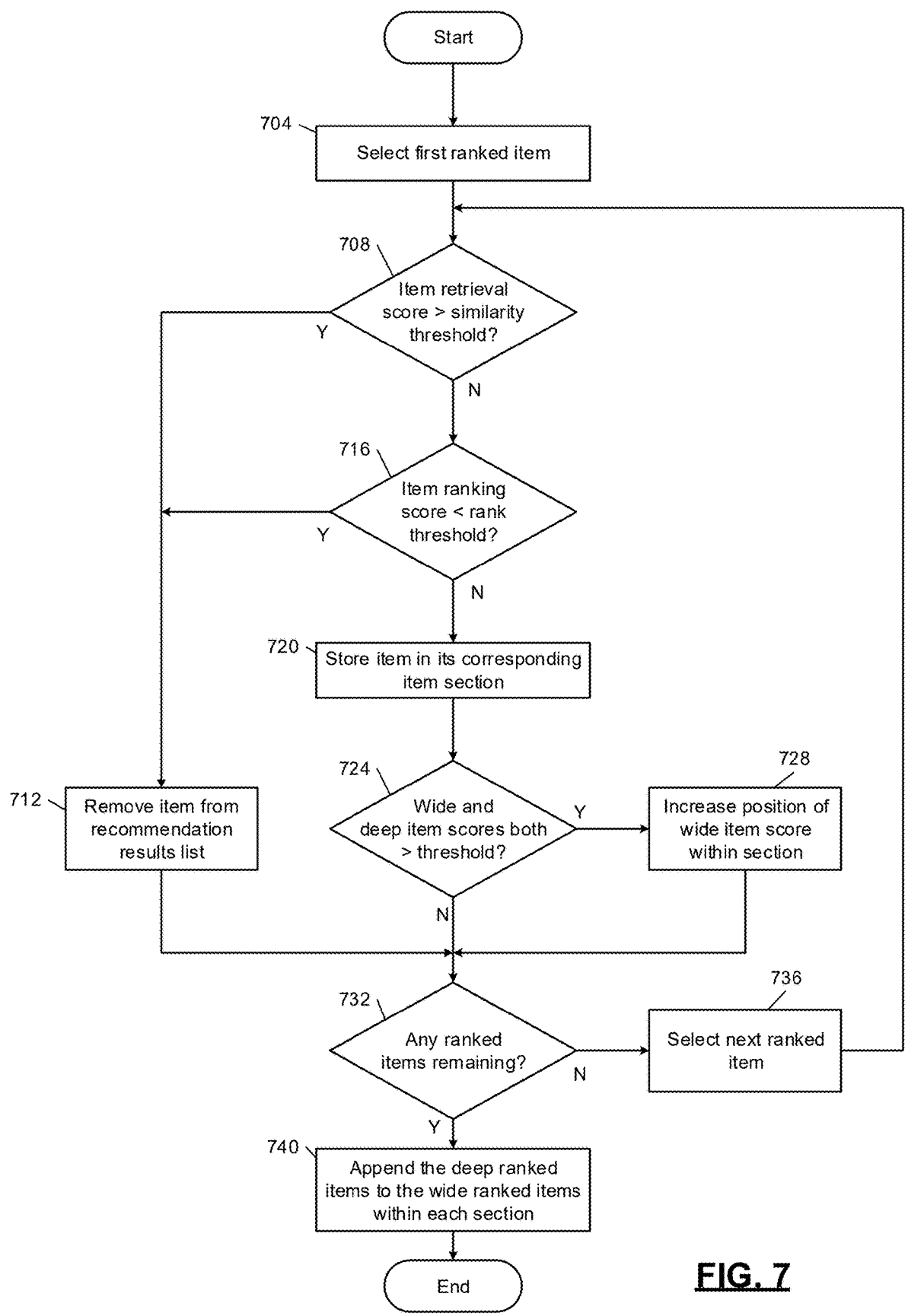
FIG. 7 is a flowchart depicting an example method of merging scores generated by wide and deep machine learning models.

FIG. 6 illustrates an example method of ranking items retrieved by wide and deep machine learning models. At 604, control begins by determining a freshness score according to the time period since a retrieved item was last published. The freshness of a news article may be a time interval between the time when a recommendation API is called, and a publish time of a news article, where a shorter time is fresher. For example, Equation 2 below illustrates an example calculation of a freshness score, where $d_{max}$ represents the sliding window size, d is a number of days that item has been published, and ft=2.0. In various implementations, other suitable variable values may be used.

$$\alpha_t = \log_{10}\left(f_t \frac{d_{max}}{d}\right) \quad \text{Equation (2)}$$

At 608, control determines a user-read score according to the time period since a related item read by the user was published. For example, Equation 3 below illustrates an example calculation of a user-read score, where $\beta_1=5$, $\beta_2=4$, and d is a number of days that the article has been published. In various implementations, other suitable variable values may be used.

$$\alpha_h = \log_{10}\left(\frac{d + \beta_1}{d + \beta_2}\right) \quad \text{Equation (3)}$$

Control then proceeds to 612 to determine a click score according to a number of overall clicks on the retrieved item. For example, Equation 4 below illustrates an example calculation of a click score, where $f_c=1.0$ and $n_c$ is the number of total user clicks on the articles. In various implementations, other suitable variable values may be used.

$$\alpha_c = f_c \log_{10}(n_c) \quad \text{Equation (4)}$$

At 616, control determines a section score according to an overlap between a section of the retrieved item and a section of a related item read by the user. For example, Equation 5 below illustrates an example calculation of a section score, where $f_s$=0.2 for a wide model, and 0.1 for a deep model, in a default setting. In various implementations, other suitable variable values may be used.

$$\alpha_s = \begin{cases} 1 + f_s & \text{in the same section} \\ 1 - f_s & \text{not in} \end{cases} \quad \text{Equation (5)}$$

Control then proceeds to 620 to determine a byline score according to an overlap between a byline of the retrieved item and a byline of the related item ready by the user. For example, Equation 6 below illustrates an example calculation of a byline score.

$$\alpha_b = \begin{cases} 1 + f_b & \text{if bylines overlap} \\ 1 - f_b & \text{if not overlap} \end{cases} \quad \text{Equation (6)}$$

At 624, control determines an overall ranking score according to the freshness score, user-read score, click score, section score and byline scores. For example, Equation 7 below illustrates an example calculation of a byline score. The ranking score formula may apply to both the wide and deep machine learning models. In various implementations, the parameters may be different due to different sensitivities of wide and deep model features.

$$s_{rank} = \alpha_t \alpha_h \alpha_c \alpha_s \alpha_b s_{retrieval} \quad \text{Equation (7)}$$

FIG. 7 illustrates an example method of merging scores generated by wide and deep machine learning models. At 704, control beings by selecting a first ranked item. Control then proceeds to 708 to determine whether an item retrieval score of the first ranked item is greater than a similarity threshold.

If control determines at 708 that an item retrieval score is greater than a similarity threshold, control proceeds to 712 to remove the item from the recommendation results list. For example, the item may be nearly identical to another item that is already being recommend or nearly identical to the query item article (such as an article about the same news event from a different publisher or writer). In various implementations, a maximum similarity threshold score for a TFIDF model may be 0.9 and a maximum similarity threshold score for a Doc2Vec model may be 0.98.

If control determines at 708 that the item retrieval score is not greater than the similarity threshold, control proceeds to 716 to determine whether the item ranking score is less than a rank threshold. If so, control proceeds to 712 to remove the item from the recommendation results list (for example, because the item is not relevant enough to the types of article that the user likes to read based on the read article history). When control determines that the item ranking score is greater than the rank threshold, control proceeds to 720 to store the item in its corresponding item section (for example, by separating both the wide model retrieved items and the deep model retrieved items into their corresponding sections).

Control then determines at 724 whether the wide and deep item scores are both greater than a threshold. If so, control increases a position of the wide item score within its section, at 728. For example, if both the wide model ranking score and the deep model ranking score of an item are high, the position of the wide model ranked item $p_{s,w}$ may move up within its section by $p_{s,w}=p_{s,w}<<1$.

At 732, control determines whether there are any ranked items remaining. If so, control selects the next ranked item at 736, and then returns to 708 to start the process of comparing scores of the next ranked item. When there are no remaining ranked items, control proceeds to 740 to append the deep ranked items to the wide ranked items in each section.

In various implementations, a merging procedure may remove items with a retrieval score that is less than a retrieval minimum threshold or greater than a retrieval maximum threshold. The merging procedure may then remove items having a rank score that is less than a rank minimum threshold or greater than a rank maximum threshold. These steps may be applied to both the wide machine learning model and the deep machine learning model, with different minimum and maximum thresholds for each model.

As an example, parameters for the deep machine learning model may include retrieval_min=0.55, retrieval_max=0.98, rank_min=0.8, and rank_max=10.0. Parameters for the wide machine learning model may include retrieval_min=0.18, retrieval_max=0.9, rank_min=0.28, and rank_max=10.0. For personalized news recommendation, ranked items may be grouped based on the section of each news article item. The groupings may be based on the user's interests according to prior click history of the user.

For each section, the merging procedure may find news articles that intersect in the wide and deep model results, and boost the scores for these items in the wide model ranked list. The intersecting items may be removed from the deep model ranked list. The ranked wide model results are then interleaved with the ranked deep model results. Next, a list of recommendations may be generated by selecting one item from each section group starting from the top of the list.

Additional Use Cases

In various implementations, wide model features and deep model features are retrieved and ranked independently. Two ranked item lists are merged afterward, which doubles the computation. The merging may be manually engineered, and may include biases. As an alternative (or in addition to the independent retrieval and ranking), the wide model and deep model retrieval and ranking may be combined at the feature level. For example, concatenated features may be retrieved and ranked in one pipeline.

Figure 8:
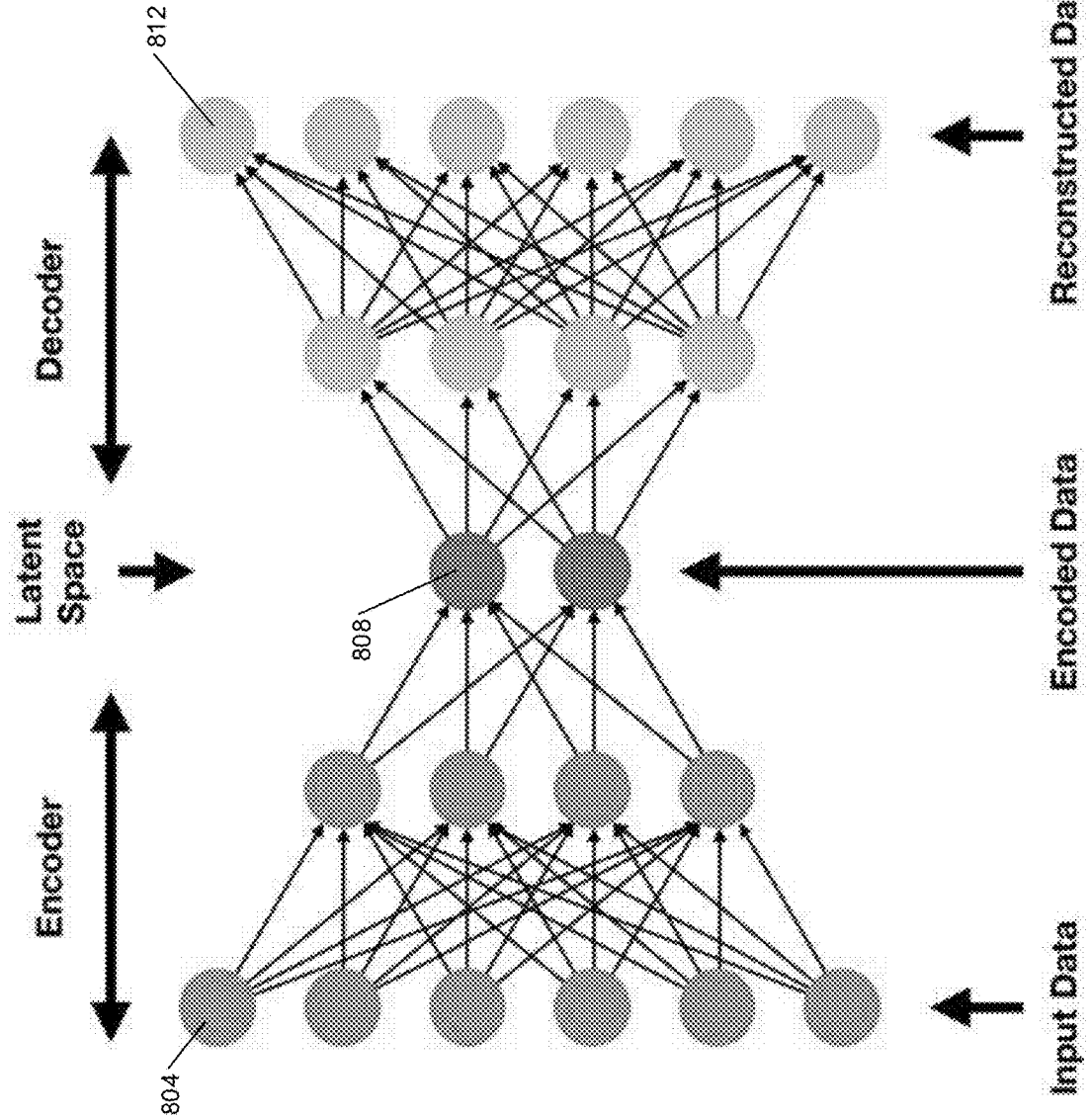
FIG. 8 is a functional block diagram illustrating an example autoencoder that merges wide and deep machine learning models at the feature level.

As shown in FIG. 8, wide sparse features may be converted to dense features with an autoencoder. FIG. 8 illustrates a functional block diagram of an example autoencoder that merges wide and deep machine learning models at the feature level. The wide sparse features and the deep dense features are concatenated, and retrieval and ranking are performed on the concatenated features.

The autoencoder includes an encoder and a decoder. The output of encoder (for example, encoded data in latent space) is the dense wide feature. As shown in FIG. 8, the autoencoder includes multiple input data elements 804, which are processed by an encoder network to create encoded data elements 808. On the other side of the autoencoder, reconstructed data elements 812 are processed by a decoder network to generate the encoded data elements 808. The encoded data elements 808 may be considered as latent space.

In various implementations, the wide and deep machine learning models may be used to combat self-imposed filter bubbles, where articles are recommended outside of the content that the user normally views. For example, by quantifying semantics to find articles with similar content to what the user typically reads, it is also possible to recommend articles with "opposing" content. The user may configure how they would like the opposing content articles to be presented, which may include factual and/or opinion articles. In various implementations, a Word2Vec model may be used to identify terms that are opposing to text of articles that the user normally reads.

Regarding roadblock links, articles typically follow a template format for inserting the roadblock links within the article text. In various implementations, if the template is not followed, the system may inject features based on retrieved and/or ranked articles. For example, the presentation or arrangement of roadblock links within the article text may be adjusted based on ranking of areas that a user is more likely to look while reading the article (such as areas where a person's eyes are more likely to fall or more likely to track the text).

In addition to arranging the location of roadblock links within the text of an article, the system may automatically generate appropriate titles, descriptions, and other information. For example, a generative pre-trained transformer 3 (GPT-3) may be used to generate appropriate titles for a roadblock link, appropriate descriptions for a roadblock link, etc., based on text or other details of the roadblock link.

In various implementations, the wide and deep machine learning models may be used in contexts other than news article recommendations. In some situations, a sliding window may not be necessary to capture recent items. For example, the wide and deep machine learning models may be used for patent searching based on seeded results from key words. Patent have well-structured content, such as a title, an abstract, claims, etc.

Additional contexts that may be suitable for using the wide and deep machine learning models may include movie recommendations, book recommendations, product recommendations, gambling opportunities, etc. For example, the models may receive inputs of available movies or books that the user may have the option to view or read, and then retrieve and rank items that have a best match to movies or books from the user's viewing or read history. The sliding window for movie or book recommendations may be longer than news items, or in some cases a sliding window may not be necessary at all.

Similarly, the models may receive inputs of available products that the user may purchase, and then retrieve and rank items that have a best match to products from the user's purchase history. As another example, the models may receive inputs of available betting options (for example, current sporting event betting opportunities) that the user may participate in, and then retrieve and rank items that have a best match to events from the user's betting history.

Computer Device

Figure 9:
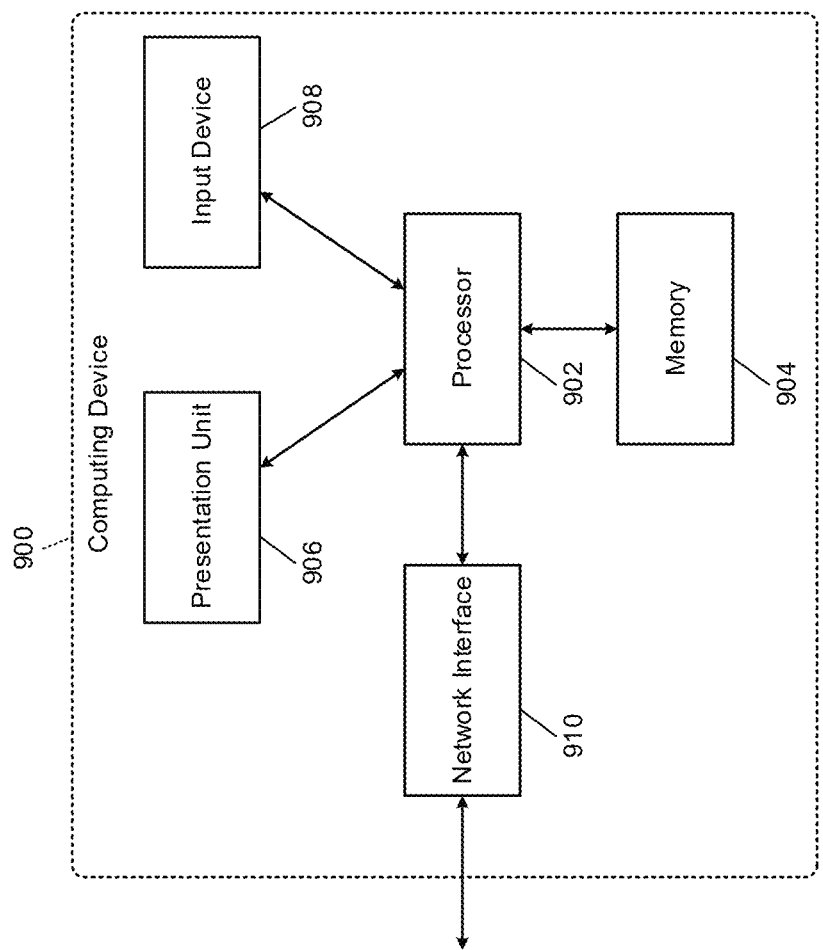
FIG. 9 is a functional block diagram of a computing device that may be used in the example system of FIG. 1.

FIG. 9 illustrates an example computing device 900 that can be used in the system 100. The computing device 900 may include, for example, one or more servers, workstations, personal computers, laptops, tablets, smartphones, etc. In addition, the computing device 900 may include a single computing device, or it may include multiple computing devices located in close proximity or distributed over a geographic region, so long as the computing devices are specifically configured to operate as described herein. In the example embodiment of FIG. 1, the database(s) 102, network(s) 104, user device(s) 106, and database controller(s) 108 may each include one or more computing devices consistent with computing device 900. The database(s) 102, network(s) 104, user device(s) 106, and database controller (s) 108 may also each be understood to be consistent with the computing device 900 and/or implemented in a computing device consistent with computing device 900 (or a part thereof, such as the memory 904). However, the system 100 should not be considered to be limited to the computing device 900, as described below, as different computing devices and/or arrangements of computing devices may be used. In addition, different components and/or arrangements of components may be used in other computing devices.

As shown in FIG. 9, the example computing device 900 includes a processor 902 including processor hardware and a memory 904 including memory hardware. The memory 904 is coupled to (and in communication with) the processor 902. The processor 902 may execute instructions stored in memory 904. For example, the wide and deep machine learning models 126 and 128 model may be implemented in a suitable coding language such as Python, C/C++, etc., and may be run on any suitable device such as a GPU server, etc.

A presentation unit 906 may output information (such as via interactive interfaces), visually to a user of the computing device 900. Various interfaces (for example, as defined by software applications, screens, screen models, and GUIs) may be displayed at computing device 900, and in particular at presentation unit 906, to display certain information to the user. The presentation unit 906 may include, without limitation, a liquid crystal display (LCD), a light-emitting diode (LED) display, an organic LED (OLED) display, an "electronic ink" display, speakers, etc. In some embodiments, presentation unit 906 may include multiple devices. Additionally or alternatively, the presentation unit 906 may include printing capability, enabling the computing device 900 to print text, images, and the like on paper and/or other similar media.

In addition, the computing device 900 includes an input device 908 that receives inputs from the user. The input device 908 may include a single input device or multiple input devices. The input device 908 is coupled to (and is in communication with) the processor 902 and may include, for example, one or more of a keyboard, a pointing device, a mouse, a stylus, a touch sensitive panel (for example, a touch pad or a touch screen), or other suitable user input devices. In various implementations, the input device 908 may be integrated and/or included with the presentation unit 906 (for example, in a touchscreen display). A network interface 910 coupled to (and in communication with) the processor 902 and the memory 904 supports wired and/or wireless communication (for example, among two or more of the components illustrated in FIG. 1).

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method of managing news recommendation filter bubbles, comprising:
   receiving, via at least one processor, a set of articles previously accessed by a user;
   determining whether a number of articles previously accessed by the user satisfies read articles count criteria;
   identifying, via the at least one processor, patterns from the set of articles previously accessed by the user;
   identifying, via the at least one processor, terms opposing the patterns in the set of articles previously accessed by the user;
   obtaining, via the at least one processor, a set of candidate articles having opposing content to the patterns based on the identified opposing terms;
   receiving, via the at least one processor, user configuration input specifying how opposing content articles should be presented;
   generating, via the at least one processor, a recommendation list including at least one article having opposing content according to the user configuration input; and
   displaying on a display device, via the at least one processor, the recommendation list to the user.

2. The method of claim 1, wherein the opposing content comprises factual articles.

3. The method of claim 1, wherein the opposing content comprises opinion articles.

4. The method of claim 1, further comprising quantifying semantics for obtaining the set of candidate articles, which includes:
   training a wide machine learning model using unsupervised learning; and
   training a deep machine learning model using unsupervised learning.

5. The method of claim 4, wherein the wide machine learning model comprises a term frequency-inverse document frequency (TFIDF) model.

6. The method of claim 4, wherein the deep machine learning model comprises a Doc2Vec model.

7. The method of claim 1, further comprising determining a freshness score for each article having opposing content.

8. The method of claim 7, wherein the freshness score is based on a time period between when a recommendation is generated and when the article was published.

9. The method of claim 1, further comprising determining a section score for each article having opposing content based on a section overlap with the set of articles previously accessed by the user.

10. The method of claim 1, wherein receiving user configuration input comprises receiving a selection between factual opposing content articles and opinion opposing content articles.

11. The method of claim 1, further comprising obtaining a popular article list when the number does not satisfy the read articles count criteria.

12. The method of claim 1, further comprising retraining a Word2Vec model periodically, thereby updating the identified opposing terms.

13. The method of claim 1, wherein analyzing the set of candidate articles comprises:
   generating a feature vector for each candidate article; and
   comparing the feature vector against the identified opposing terms.

14. The method of claim 1, further comprising calculating a similarity score between each candidate article and the articles previously accessed by the user.

15. The method of claim 14, further comprising removing candidate articles having a similarity score above a threshold to ensure opposing content.

16. The method of claim 1, wherein the recommendation list includes both similar content articles and opposing content articles.

17. The method of claim 1, further comprising identifying user engagement with recommended opposing content articles including at least one of the following: a number of user views, a view time, and an eye movement.

18. The method of claim 1, further comprising identifying the opposing terms via Word2Vec.

19. The method of claim 1, further comprising capturing a change of interest of the user based on at least one sliding window.

20. The method of claim 1, wherein generating the recommendation list includes processing the set of candidate articles by a trained wide machine learning model to generate a wide ranked element list, processing the set of candidate articles by a trained deep machine learning model to generate a deep ranked element list, and merging elements of the wide ranked element list and the deep ranked element list to generate the recommendation list.

21. A computer-implemented method of managing news recommendation filter bubbles, comprising:
   receiving, via at least one processor, a set of articles previously accessed by a user;
   identifying, via the at least one processor, patterns from the set of articles previously accessed by the user;
   identifying, via the at least one processor, terms opposing the patterns in the set of articles previously accessed by the user;
   obtaining, via the at least one processor, a set of candidate articles having opposing content to the patterns based on the identified opposing terms;
   calculating a similarity score between each candidate article and the articles previously accessed by the user;
   removing candidate articles having a similarity score above a threshold to ensure opposing content;
   receiving, via the at least one processor, user configuration input specifying how opposing content articles should be presented;
   generating, via the at least one processor, a recommendation list including at least one article having opposing content according to the user configuration input; and
   displaying on a display device, via the at least one processor, the recommendation list to the user.

* * * * *